UNITED STATES PATENT OFFICE.

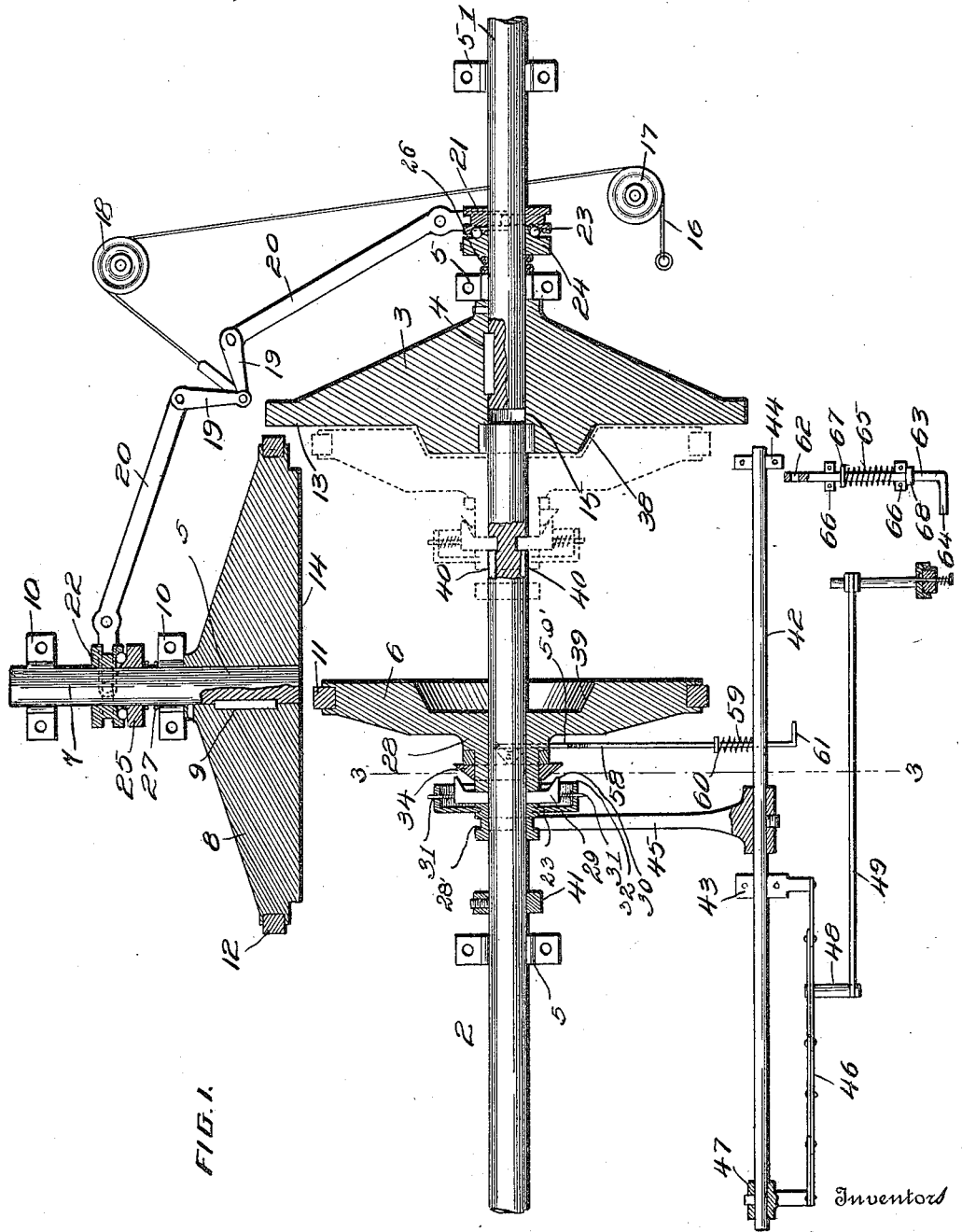

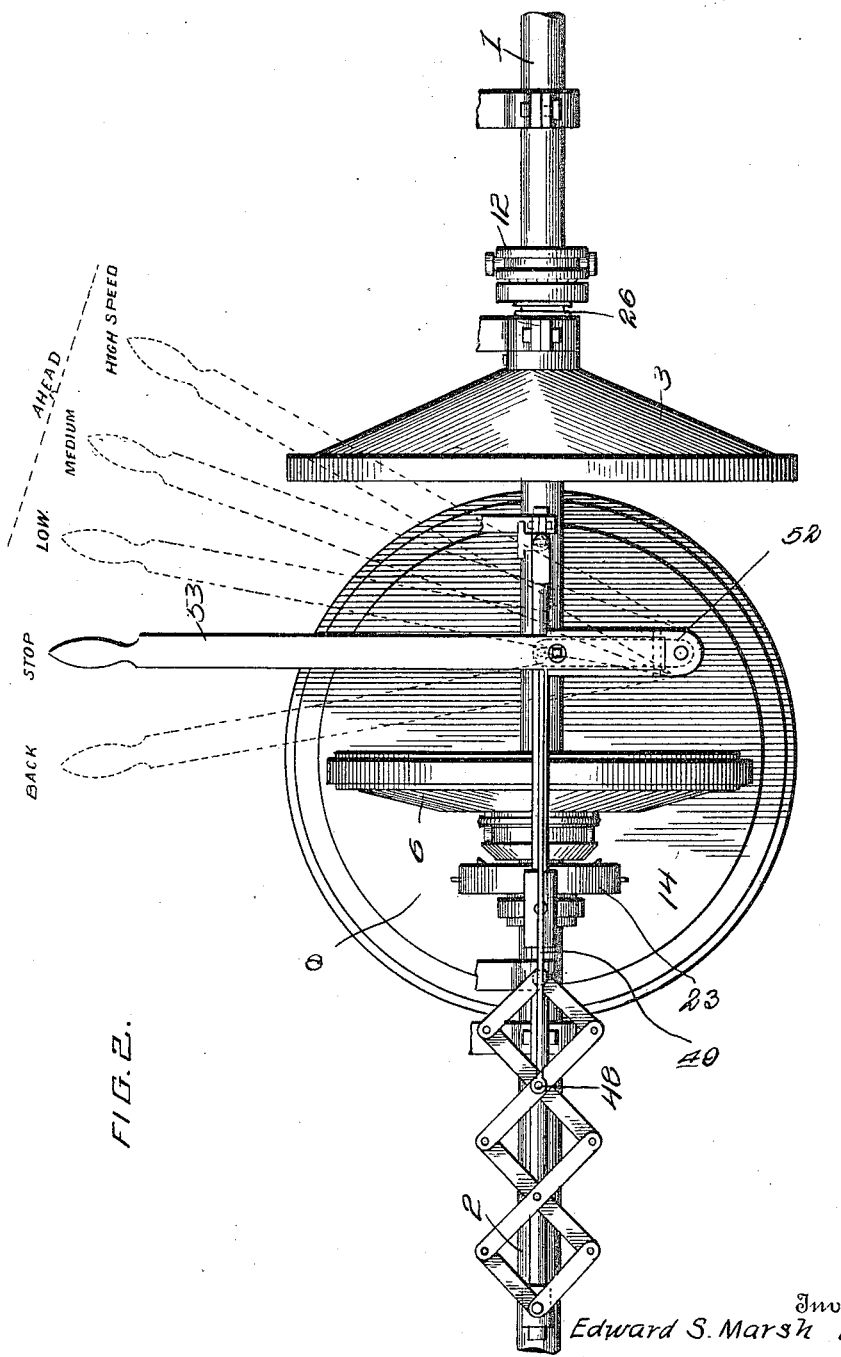

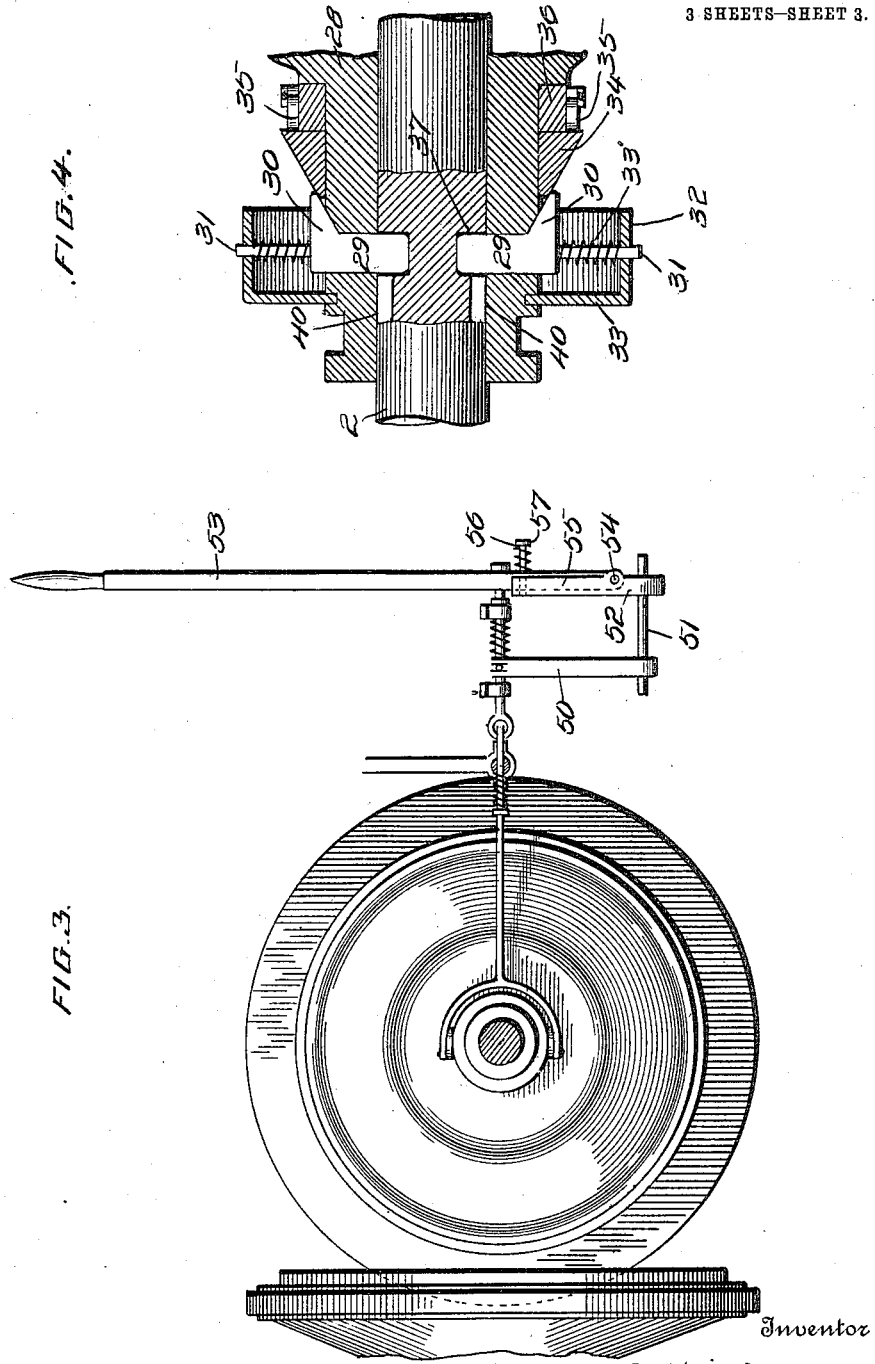

EDWARD S. MARSH AND ROGER M. MARSH, OF ROCHESTER, NEW YORK.

TRANSMISSION-GEARING FOR AUTOMOBILES.

994,017. Specification of Letters Patent. Patented May 30, 1911.

Application filed February 26, 1910. Serial No. 546,063.

*To all whom it may concern:*

Be it known that we, EDWARD S. MARSH and ROGER M. MARSH, citizens of the United States, residing at Rochester, in the county of Monroe and State of New York, have invented new and useful Improvements in Transmission-Gearing for Automobiles, of which the following is a specification.

This invention relates to transmission gearing for automobiles, the object of the present invention being to provide a novel and effective system of friction gearing for transmitting motion of the engine shaft to the driving shaft of a motor car and varying the relative speed of said shafts in accordance with varying requirements. The construction of the transmission gearing also enables the transmission shaft to be reversed relatively to the engine shaft or to be clutched directly to the engine shaft when driving at higher speed.

With the above general object in view the invention consists in the novel construction, combination and arrangement of parts hereinafter fully described, illustrated and claimed.

In the accompanying drawings:—Figure 1 is a central longitudinal section through the transmission gearing of this invention. Fig. 2 is a side elevation of the same. Fig. 3 is a cross section on the line 3—3 of Fig. 1. Fig. 4 is an enlarged detailed longitudinal section showing the means for locking the driven friction wheel to the transmission shaft.

Referring to the drawings 1 designates the engine shaft and 2 the transmission shaft or as it is commonly called in automobiles the drive shaft. While the shaft 1 is referred to as an engine shaft, it will be understood that said shaft need not necessarily be in one piece with the engine shaft and in fact it is usual to make said portion of the shaft separate from the engine shaft but coupled thereto so that said shaft 1 is capable of a limited amount of longitudinal movement.

3 designates the drive wheel or disk which is mounted fast on the shaft 1 being keyed thereon as shown at 4 and the shaft 1 is mounted for a limited amount of sliding movement in bearings 5 of any suitable description connected to the frame of the car.

6 designates the driven wheel which is mounted to rotate with the shaft 2 and which is also capable of a sliding movement lengthwise of the shaft 2.

Mounted on a shaft 7 extending at right angles to the shaft 2 is an intermediate friction wheel 8 which is keyed to the shaft 7 as shown at 9, the shaft 7 being mounted in bearings 10 secured to the main frame so as to admit of a limited amount of endwise movement of said shaft for a purpose which will appear. The wheels 6 and 8 have their peripheries grooved and fiber bands or shoes 11 and 12 are secured in said grooves and adapted to operate in driving contact with the adjacent faces of the other wheels, the band 12 of the wheel 8 being designed to operate in contact with the adjacent flat face 13 of the drive wheel 3 while the band 11 of the wheel 6 is adapted to operate in driving contact with the flat face 14 of the wheel 8. The wheel 3 is bored as shown at 15 to provide a bearing for the shaft 2 and to admit of the sliding movement of the wheel 3 on the shaft 2 toward and away from the wheel 8. The sliding movement of the wheels 3 and 8 is effected by means of a foot operated cable 16 which passes around guide pulleys 17 and 18 on the frame of the machine and is connected by means of a pair of links 19 to a pair of shipping levers 20 which engage grooved collars 21 and 22 on the shafts 1 and 7 respectively. The collar 21 is hollowed out to form a cup in which is arranged a series of anti-friction balls 23 which operate in contact with the cone face collar 24 fast on the shaft 1 and the wheel 3 may be moved in a direction to cause the wheel 3 to bear against the periphery of the wheel 8. A coil spring 26 serves by bearing against the collar 24 to move the wheel 3 away from the wheel 8 and a corresponding but weaker spring 27 operates against the collar 25 to push the wheel 8 out of contact with the wheel 6.

The wheel 6 is provided with an extended hub 28 provided at diametrically opposite points with apertures in which are slidingly arranged a pair of keys 29 having wedge-shaped lips 30. The keys 29 are provided with outwardly projecting stems 31 which operate through the rim 32 of a housing 33. Springs 33′ encircle the stems 31 of the keys to move said keys normally inward. The keys 29 are forced apart or thrust outward by means of a sliding cone or spreader 34 which is mounted to slide lengthwise on the hub 28 which it encircles as best illustrated in Fig. 4. The cone or spreader 34 is operated by means of oppositely located cams 35 which are pivotally mounted on a collar 36 loose on the hub 28. These cams operate against the spreading cone 34 to urge the same under the wedge-shaped lips 30 of the keys 29, resulting in an outward movement of said keys, the inner ends of which are adapted to enter sockets or notches 37 in the shaft 2 as clearly illustrated in Fig. 4, said notches 37 being so located that when the keys 29 are interlocked therewith, the face of the wheel 6 is in contact with the adjacent face of the wheel 3 as indicated by dotted lines in Fig. 1. Immediately at the center, the wheel 3 is provided with a substantially cone-like friction element 38. The wheel 6 is provided with a correspondingly shaped recess 39 to receive the said friction element so that when the wheel 6 is brought up against the wheel 3 these two wheels are locked together thereby causing simultaneous and equal rotation of the shafts 1 and 2 without the intervention of the intermediate gear 8. The shaft 2 is provided at diametrically opposite points with keyways or grooves 40 in which the keys 29 move as the wheel 6 is slid lengthwise of the shaft 2 thus causing said shaft and wheel to always rotate together.

41 designates a stop collar fast on the shaft 2 for limiting the sliding movement of the wheel 6 in one direction. The mechanism for shifting the wheel will now be described.

42 designates a shifting rod extending parallel to the shaft 2 and mounted to slide in bearings 43 and 44 connected to the machine frame. The rod 42 carries a shifting fork 45 which engages the grooved part 28' of the wheel 6 so that when the rod 42 is moved lengthwise, the wheel 6 is slid lengthwise of the shaft 2. The rod 42 is shifted lengthwise by means of lazy tong members 46 pivotally connected at one end to the bearing 43 referred to and carrying at their opposite ends a head piece 47 which is fastened to the rod 42. Connected to one of the intermediate joints of the lazy tong members by means of a pin 48 is a connecting rod 49 which is attached at its opposite end to a lever arm 50 on a rock shaft 51 to which is connected the bottom section 52 of a hand operated transmission lever 53, the main or upper section of said lever being pivotally connected at 54 to the bottom section thereof and being held in alinement therewith and between parallel flanges 55 of the bottom section 52 by a spring 56 embracing a headed pin 57 passing through a hole in the lever 53 and connected fast to the upper end of the bottom section 52 of said hand lever. It will now be seen that by swinging the hand lever 53 in the manner indicated in Fig. 2 or in a plane parallel with the shaft 2, the shifting rod 42 will be moved in a corresponding direction thereby shifting the wheel 6 across the face of the wheel 8.

Means for operating the cams 35 consists of a fork 59' the extremities of which are pivotally connected to the cams 35 and the outer end of which is adapted to slide through an opening in the rod 42, the cams being held normally inactive by means of a coil spring 59 which is interposed between the rod 42 and a shoulder 60 on the fork 58. At its outer end the sliding fork 58 is provided with a band or L-shaped tongue 61, which when the shifting rod 42 and the wheel 6 have been slid to the full extent of their movement toward the wheel 4, enters an eye 62 in a pull rod 63 having a suitable handle 64 at the outer end thereof. The pull rod 63 is sustained normally in position to receive the tongue 61 by means of a coil spring 65 interposed between one of the bearings 66 and the shoulder 67. The spring 65 permits the rod 63 to be pulled outward, while a stop collar 68 limits the inward movement thereof.

From the foregoing description it will be understood that by shifting the wheel 6 across the face of the wheel 8 while the last-named wheel is in driving contact with the drive wheel 3, the relative speeds of the shafts 1 and 2 may be varied and by shifting the wheel 6 in the direction of the stop collar 41, the direction of rotation of the shaft 2 may be reversed relatively to the direction of rotation of the shaft 1. When the wheel 6 is shifted up against the face of the wheel 3, the clutch faces 38 and 39 engage and lock said wheels together and in this position the shaft 2 is driven direct from the shaft 1. In the last-named position, the keys 29 occupy the notches 37 in the shaft 2. Also in this position the lever 53 lies behind the handle 64 of the pull rod 63 so that when the operator desires to unlock the wheel 6, he pulls outward on the lever 53 causing it to act against the handle or bent end 64 of the pull rod 63 and on moving said rod 63 outward a corresponding movement will be imparted to the fork 58. This results in operating the cams 35 and drawing the keys 29 out of the notches 37. The wheel 6 may then be shifted away from the wheel 3 and along the shaft 2 by swinging the lever 53 to any of the positions indicated by full and dotted lines in Fig. 2 it being understood that when the periphery of the wheel 6 is contacting with the center of the wheel 8, the mechanism is at neutral and that when said lever is moved ahead of the neutral point the machine is driving ahead while when it is moved to the rear of the neutral point the mechanism is in reverse. The lazy tong members are used for the purpose of facilitating the sliding movement of the shifting rod 42 and consequently the friction wheel 6.

We claim:—

1. Transmission gearing embodying longitudinally alined driving and transmission shafts arranged end to end, a friction drive wheel fast on the driving shaft, a friction driven wheel slidable on the transmission shaft and having a keyed engagement therewith, an intermediate friction wheel movable at right angles to the transmission shaft, means for shifting the driven wheel lengthwise of the transmission shaft across the face of the intermediate wheel and up against the driving wheel, and means for locking the driven wheel to the transmission shaft while in contact with the driving wheel.

2. Transmission gearing comprising longitudinally extending driving and transmission shafts, a friction driving wheel on the driving shaft, a friction driven wheel on the transmission shaft and keyed thereto for sliding movement, an intermediate friction wheel movable at right angles to the transmission shaft, means for throwing said friction wheels into driving relation to each other, means for shifting the driven friction wheel across the intermediate friction wheel, and means for locking the driven friction wheel to the transmission shaft embodying a pair of radially movable keys carried by the hub of the driven friction wheel, means for normally urging said keys inward to engage notches in the transmission shaft, and means for moving said keys out of engagement with the notches in the transmission shaft including a hand operated lever, and connections between said lever and the keys.

3. Transmission gearing embodying longitudinally alined driving and transmission shafts, a friction drive wheel fast on the driving shaft, a friction driven wheel on the transmission shaft and keyed thereto for sliding movement, an intermediate friction wheel movable at right angles to the transmission shaft, means for moving said wheels into driving contact, a hand operated transmission lever, connections between said lever and the driven friction wheel for shifting the latter across the face of the intermediate friction wheel, locking means on the driven friction wheel for engaging the transmission shaft and connections between said hand lever and the driven friction wheel for releasing the locking means from the transmission shaft.

4. Transmission gearing comprising longitudinally extending driving and transmission shafts, a friction drive wheel fast on the driving shaft, a friction wheel slidable on the transmission shaft and keyed thereto, an intermediate friction wheel movable in a direction at right angles to the transmission shaft, means for moving the said friction wheels into and out of contact, means for shifting the driven friction wheel across the face of the intermediate driven friction wheel including a hand operated transmission lever, a shifting rod parallel to the transmission shaft and connected to said hand lever, a shifting fork carried by said shifting rod and engaging the hub of the driven friction wheel, a sliding key carried by the driven friction wheel, and movable into engagement with a notch in the transmission shaft when the driven wheel is in contact with the driving wheel, a spreader for moving said key out of engagement with the notch in the transmission shaft, a cam for operating said spreader, a fork connected with said cam and having a sliding engagement with said shifting rod, and a pull rod arranged to be operated by the transmission lever and also arranged for interlocking engagement with the cam operating fork when the driven wheel is in contact with the driving wheel, substantially as described.

In testimony whereof we affix our signatures in presence of two witnesses.

EDWARD S. MARSH.
ROGER M. MARSH.

Witnesses:
Wm. S. Foster,
P. A. Costich.